(12) United States Patent
Rotmann et al.

(10) Patent No.: US 10,208,702 B2
(45) Date of Patent: Feb. 19, 2019

(54) METHOD FOR PRODUCING A PISTON

(71) Applicant: Mahle International GmbH, Stuttgart (DE)

(72) Inventors: Udo Rotmann, Marburg (DE); Armin Wenzel, Wellendingen (DE); Juergen Friedrich, Attendorn (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 15/755,061

(22) PCT Filed: Aug. 15, 2016

(86) PCT No.: PCT/EP2016/069319
§ 371 (c)(1),
(2) Date: Feb. 23, 2018

(87) PCT Pub. No.: WO2017/032624
PCT Pub. Date: Mar. 2, 2017

(65) Prior Publication Data
US 2018/0252181 A1   Sep. 6, 2018

(30) Foreign Application Priority Data
Aug. 26, 2015   (DE) .................. 10 2015 216 321

(51) Int. Cl.
*F02F 3/08*   (2006.01)
*B21K 1/18*   (2006.01)
(Continued)

(52) U.S. Cl.
CPC .................. *F02F 3/08* (2013.01); *B21K 1/18* (2013.01); *B22D 15/02* (2013.01); *B22F 3/1118* (2013.01);
(Continued)

(58) Field of Classification Search
CPC ... F02F 3/08; B21K 1/18; B22D 15/02; B22F 3/1118; F16J 1/005
See application file for complete search history.

(56) References Cited

U.S. PATENT DOCUMENTS 2,124,360 A    7/1938  Welty
4,364,159 A    12/1982 Holcombe
(Continued)

FOREIGN PATENT DOCUMENTS

DE    2015125 A1    10/1971
DE    3127400 A1    3/1982
(Continued)

OTHER PUBLICATIONS

English abstract for DE-102012024406.
English abstract for DE-2015125.
English abstract for DE-102007010839.

*Primary Examiner* — Kevin A Lathers
(74) *Attorney, Agent, or Firm* — Fishman Stewart PLLC

(57) ABSTRACT

A method for producing a piston may include forming a piston blank in a first forming tool such that the piston blank surrounds a ring carrier configured to receive a piston ring via positive engagement after producing the ring carrier by a sintering process. The piston blank, at least in a circumferential region disposed at a piston head, may be composed of a light metal alloy suitable for forging. The method may also include removing the piston blank from the first forming tool and placing the piston blank in a second forming tool, and inserting a holding-down tool into the second forming tool to hold the ring carrier down. The method may further include pressing a final forming punch into the second forming tool to deform the piston blank and form a piston.

20 Claims, 2 Drawing Sheets

(51) Int. Cl.
  *B23P 15/10*   (2006.01)
  *F16J 1/00*   (2006.01)
  *B22D 15/02*   (2006.01)
  *B22F 3/11*   (2006.01)
  *F02F 3/00*   (2006.01)

(52) U.S. Cl.
  CPC .............. *B23P 15/10* (2013.01); *F16J 1/005* (2013.01); *F02F 2003/0007* (2013.01); *F02F 2200/04* (2013.01); *F05C 2201/021* (2013.01)

(56) References Cited

U.S. PATENT DOCUMENTS

| | | | |
|---|---|---|---|
| 4,547,336 | A | 10/1985 | Mahrus et al. |
| 6,507,999 | B1 * | 1/2003 | Kaibyshev ................ B21J 5/02 29/888.042 |
| 2012/0160206 | A1 | 6/2012 | Takahashi et al. |

FOREIGN PATENT DOCUMENTS

| | | |
|---|---|---|
| DE | 3300582 C2 | 10/1994 |
| DE | 102007010839 A1 | 9/2008 |
| DE | 102011122626 A1 | 6/2012 |
| DE | 102012024406 A1 | 5/2013 |
| HU | 190829 B | 11/1986 |
| SU | 575169 A * | 10/1977 |
| SU | 1255266 A1 | 9/1986 |
| WO | 2015014787 A1 | 2/2015 |

* cited by examiner

METHOD FOR PRODUCING A PISTON

CROSS-REFERENCE TO RELATED APPLICATIONS

This application claims priority to International Patent Application No. PCT/EP2016/069319, filed on Aug. 15, 2016, and German Patent Application No. DE 10 2015 216 321.0, filed on Aug. 26, 2015, the contents of both of which are hereby incorporated by reference in their entirety.

TECHNICAL FIELD

The present invention relates to a method for producing a piston, which, at least in a circumferential region close to a piston head, is composed of a light metal alloy. The invention furthermore relates to a piston produced by this method.

BACKGROUND

DE 10 2012 024 406 A1 discloses a method of the type in question for producing a piston, in which at least the circumferential piston-skirt region close to the piston head is composed of a light metal alloy which is suitable for forging and has at least one ring carrier to receive a piston ring. The known method starts with a piston having a stepped circumferential surface, more specifically such that, starting from a step, the piston has a reduced diameter toward the piston head and that the ring carrier is placed on this step and then connected firmly to the piston by forging the piston. However, the disadvantage with this method is that relatively high forces act during the forging in of the ring carrier, and these must be dissipated via the previously forged and relatively thin-walled internal shape region, leading there to high loads and possibly also causing damage associated with said loads.

DE 33 00 582 C2 discloses a method involving powder metallurgy for the production of ring carriers on pistons composed of austenitic iron alloys. In this case, a charge of the iron alloy is first of all melted in a furnace, the melt is poured out and atomized by means of a water, air or gas stream to produce powder with grain sizes in a range of from 0.044 to 0.42 mm with an austenitic white cast iron structure and no effective green strength. The material produced in this way is then annealed in a reducing atmosphere and a quantity of lubricant sufficient to ensure that subsequent compression to give the desired groove shape results in a maximum possible green density is added to said material, and then the lubricant is burnt off in a protective atmosphere, after which the compressed material is sintered and then abruptly cooled.

In general, increasing ignition pressures and higher combustion temperatures are a known means in engine development of enabling fuel consumption to be reduced. However, increased ignition pressures and higher combustion temperatures also make greater demands on the materials used for the pistons, and therefore these are usually produced from aluminum alloys in a gravity die casting process. For special requirements, forged pistons are also produced for spark ignition engines since a forming process may give them better physical material characteristics in some circumstances.

Also on account of the increasing ignition pressures, ring carriers for reinforcing a first piston ring groove are also increasingly being cast into the piston, wherein these ring carriers generally produced from an austenitic cast iron by centrifugal casting and by permanent mold casting using an Al-Fin process, which brings about a metallurgical bond between the ring carrier and the piston alloy. However, an Al-Fin process of this kind cannot be applied to forged ring-carrier pistons since it is not possible for a metallurgical bond to develop owing to the existing oxide skin on the surface of the forging blank.

In the case of forged pistons, therefore, the practice hitherto has been, for example, to machine a larger groove than the subsequent groove in the production piston into a forging blank with contours close to the final state and then to fill this groove with a wear-resistant material by a thermal coating method. In further machining operations, the final geometry of the annular groove was then produced, wherein the groove reinforcement is ensured by the wear-resistant material applied by thermal spraying. However, a method of this kind is relatively complex and, as a result, extremely expensive.

Another possibility is provided by the forging in of the ring carrier, a method which is known from DE 10 2012 024 406 A1, for example, wherein, in a first forming step, the upset piston blank is initially preformed or preprocessed in such a way that a surface on which the ring carrier can be positioned before the second forming step is preformed at the ultimate position of the piston groove reinforcement. However, it was only possible to produce mechanical interlocking between the ring carrier and the piston blank in the second forming step if the ring carrier had been provided with undercuts, e.g. by mechanical processing, before being forged in. However, the disadvantage with this method are the relatively high production costs, which are caused, in particular, by the production of the undercuts and the necessity of an additional forging or processing step.

It has furthermore been found that, owing to the differing expansion coefficients of the aluminum alloys of the piston materials and of the iron alloys of the potential ring carrier alloy, the mechanically produced undercuts are not sufficient at high ignition pressures to permanently ensure a mechanical bond and avoid damage due to the failure of the ring carrier bond with the piston.

SUMMARY

The present invention is therefore concerned with the problem of indicating an improved or at least alternative embodiment for a method of the type in question, which embodiment overcomes the disadvantages known from the prior art in forging a ring carrier into a piston.

According to the invention, this problem is solved by the subject matter of the independent claim(s). Advantageous embodiments form the subject matter of the dependent claims.

The present invention is based on the general concept of providing an intermediate step, in which a radially outer support, referred to as a holding-down tool, fixes the ring carrier over at least partial areas or over the entire circumference thereof, thereby enabling an internal shape to be forged by means of a final forming punch without the ring carrier previously forged in being subject to high loads and being damaged. In the forging method known from DE 10 2012 024 406 A1, in contrast, relatively high forces act, and these must be dissipated via the previously forged and relatively thin-walled internal shape region, which can lead to damage there. In the method according to the invention, this sequence is not only reversed, that is to say forging in of the ring carrier takes place first and only then is final forming of an internal shape carried out, but, in addition, the ring carrier is fixed by the holding-down tool during the production of the internal shape and is thereby relieved of loads to a considerable extent. In the method according to the invention for the production of a piston which, at least in a circumferential region close to a piston head, is composed of a light metal alloy which is suitable for forging and has at least one ring carrier to receive a piston ring, the piston blank is thus first of all formed in a first forming tool until the piston blank surrounds the ring carrier, which is produced by a sintering process and is therefore porous, by positive engagement and positively infiltrates said ring carrier, in particular at least at the ring carrier surfaces, and interlocks therewith, thereby ensuring particularly reliable fixing. The preforged piston blank is then removed from the first forming tool and placed in a second forming tool, and the holding-down tool according to the invention is inserted, which holds the ring carrier down during a subsequent further forging step. After this, the final forming punch is pressed in and the piston blank is thereby finally formed in respect of the internal shape thereof to give the piston. As stated, in the method according to the invention not only is the production process reversed in comparison with the production method known from the prior art but, in addition, the ring carrier is fixed by the holding-down tool during the final forging process and thereby relieved of loads, making it possible for the first time to produce a forged piston with a forged-in ring carrier reliably, in a dependable process and furthermore economically and, as a result, in a manner suitable for large production runs. In this case, any remaining residual porosity of the porous ring carrier can also be sealed by thermally stable impregnation resins after forging.

In an advantageous development of the solution according to the invention, the piston blank is first of all placed in a bottom die of the first forming tool in such a way that a subsequent piston head of the piston blank rests on an upsetting base of the bottom die, wherein, at the piston head, the piston blank has a first diameter, which narrows via a step to a second, smaller diameter, and wherein the piston blank is held positively by means of its first diameter in the bottom die. In this sense, "positively" means that an inside diameter of the bottom die corresponds substantially to an outside diameter of the piston blank in the piston head region thereof. The ring carrier, which is produced by the sintering process, is then placed on the step, wherein the outside diameter of said ring carrier corresponds to an inside diameter of the bottom die and is thus likewise held positively in the bottom die. A top die is now placed on the bottom die, wherein an inside diameter of the top die is smaller than an inside diameter of the bottom die, with the result that, during subsequent upsetting of the piston blank by means of an upsetting punch, not only is the ring carrier firmly connected to the piston, in particular being interlocked by infiltration, but, in addition, the piston blank is given a further step. The piston blank preforged in this way is then removed from the first forming tool and placed in a second forming tool, the inside diameter of which corresponds to the inside diameter of the bottom die of the first forming tool, wherein a subsequent piston head of the piston blank now rests on a final forming base of the second forming tool. The holding-down tool is then inserted, which holds down the ring carrier during a further forging step, namely during final forging, and the inside diameter of which corresponds to the inside diameter of the top die of the first forming tool. Once the holding-down tool has been inserted, the final forming punch is pressed in and the piston blank is thereby formed to give the piston. The piston can then be removed from the second forming tool and finish-machined, in particular by cutting or grinding. All the abovementioned production steps can be carried out in series in a dependable process and in a fully automated way and, as a result, also economically, thus enabling the piston according to the invention having the forged-in ring carrier to be produced economically and, at the same time, with a high quality.

In an advantageous development of the solution according to the invention, the ring carrier is heated under a protective gas atmosphere before being placed in the first forming tool. Heating the ring carrier offers the advantage that infiltration of the piston alloy into the pores and the undercuts of the ring carrier surface takes place more easily since a cold ring carrier removes too much heat from the piston material and hence makes infiltration more difficult. Heating the ring carrier under a protective gas atmosphere prevents corrosion of or even scale formation on the ring carrier if the ring carrier is not composed of rust-resistant materials such as austenitic alloys. Corrosion can be limited and, in particular, scale formation prevented if the pre-heating temperature can be precisely defined, as is the case, for example, with inductive heating in exactly the same cycle sequence as or in an even shorter cycle sequence than the forging process. The ring carrier is therefore preferably heated so rapidly before being placed in the first forming tool that the heat-up time of the ring carrier is shorter than the cycle time for forging.

It is expedient if a temperature of the piston blank during upsetting is no more than 220 K, preferably 50 to 80 K, below the solidus temperature of the two main alloying components of the piston alloys, which are generally based on the AlSi or AlCu system. This ensures that temperature fluctuations of the piston during engine operation do not lead to excessive stresses at the interfaces between the piston alloy and the ring carrier owing to the differing thermal expansion coefficients of the two materials and that damage to the mechanical bond is thus prevented.

In another advantageous embodiment of the solution according to the invention, a sintering powder containing more than 28% by volume of particles with a diameter d<150 μm is used for sintering the ring carrier. By means of such a granular sintering powder, it is possible to achieve a porosity of the sintered ring carrier of between 20% by volume and 80% by volume, which is highly advantageous for infiltration and thus reliable interlocking during forging.

In another advantageous embodiment, a piston produced by the method described above comprises an aluminum-silicon alloy or an aluminum-copper alloy. By adding the semimetal silicon, the suitability for casting and wear resistance of the aluminum alloy can be improved, for example, whereas, by adding copper, corrosion resistance can be improved.

Further important features and advantages of the invention will become apparent from the dependent claims, the drawings and the associated description of the figures with reference to the drawings.

It is self-evident that the features mentioned above and those which remain to be explained can be used not only in the respectively indicated combination but also in other combinations or in isolation without exceeding the scope of the present invention.

Preferred illustrative embodiments of the invention are shown in the drawings and are explained in greater detail in the following description, wherein identical reference signs refer to identical or similar or functionally identical components.

BRIEF DESCRIPTION OF THE DRAWINGS

The figures are in each case schematic, wherein.

DETAILED DESCRIPTION

Figure 1:
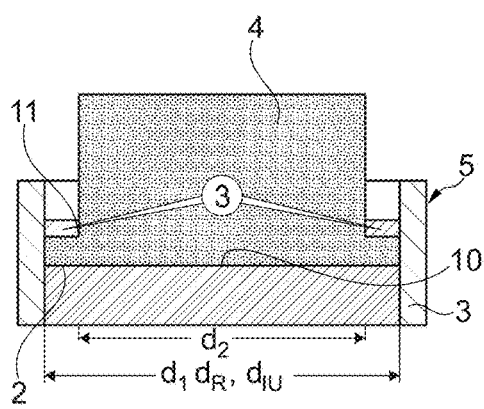
FIG. 1 shows a section through a first forming tool in the region of a bottom die for carrying out a method according to the invention for the production of a piston.

FIGS. 1 to 9 show a method according to the invention for producing a piston 1, which, at least in a circumferential region close to a piston head 2, is composed of a light metal alloy which is suitable for forging and has at least one ring carrier 3 to receive a piston ring (not shown).

In general, the method according to the invention is divided into three production steps, wherein, in a first production step, which is illustrated in FIGS. 1 to 6, a piston blank 4 is formed in such a way in a first forming tool 5 that it surrounds the ring carrier 3 produced by a sintering process by positive engagement. FIGS. 7 and 8 then show an intermediate step in a second forming tool 7, in which a holding-down tool 6 is inserted into a die of the second forming tool 7 and holds the ring carrier 3 down directly or indirectly during a forging step, which follows on according to FIG. 9. The third and last method step is thus shown in FIG. 9, in which a final forming punch 8 is pressed into the die of the second forming tool 7 and the piston blank 4 is thereby formed to give the piston 1. By means of the method according to the invention, it is possible to relieve the load on that region of the piston 1 at the ring carrier 3 which was hitherto subject to extremely high loads and, at the same time, to produce a forged piston 1 having a forged-in ring carrier 3 in a dependable process and in an economical manner and, at the same time, with a high quality. In the method according to the invention, in contrast to the previously known method, the internal shape comprising the case and bosses is produced only after the forging in of the ring carrier 3, which is a complete departure from the previous procedure.

If the method according to the invention is then considered, the piston blank 4 will, according to the method step illustrated in FIG. 1, first of all be placed in a bottom die 9 of the first forming tool 5 in such a way that a subsequent piston head 2 rests on an upsetting base 10 of the bottom die 9, wherein, at the piston head 2, the piston blank 4 has a first diameter $d_1$, which narrows via a step 11 to a second, smaller diameter $d_2$, and wherein the piston blank 4 is held positively by means of its first diameter $d_1$ in the bottom die 9 of the first forming tool 5. The piston blank 4 thus rests by means of an outer lateral surface on an inner lateral surface of the bottom die 9. According to FIG. 1, the ring carrier 3, which is produced by a sintering process, is then placed on the step 11, wherein the outside diameter $d_R$ of the ring carrier 3 corresponds to an inside diameter $d_{IU}$ of the bottom die 9 and thus substantially to the diameter $d_1$.

Figure 2:
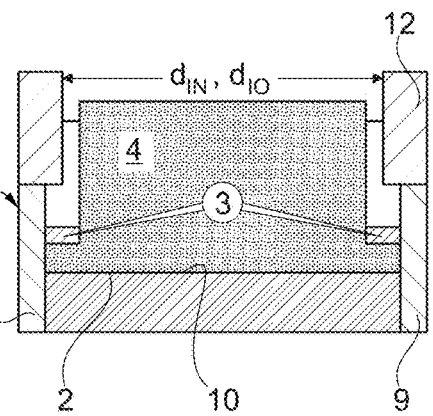
FIG. 2 shows an illustration like that in FIG. 1 but with the top die placed on top.
Figure 3:
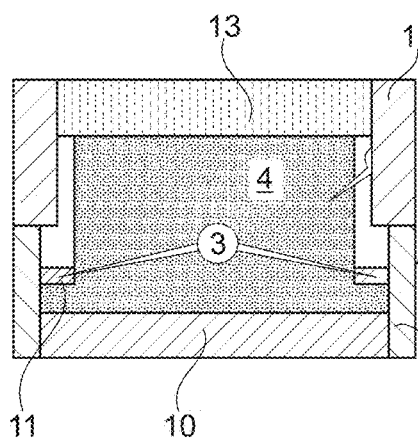
FIG. 3 shows an illustration like that in FIG. 2 but with the upsetting punch in contact.
Figure 4:
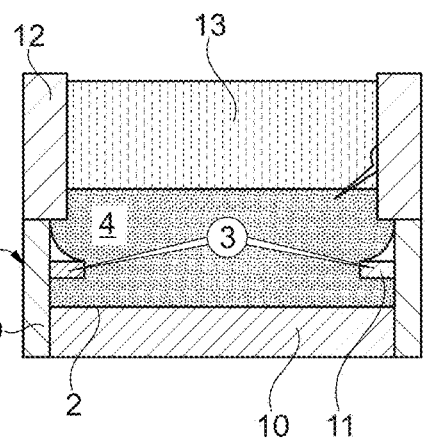
FIG. 4 shows a piston blank in a partially upset state.
Figure 5:
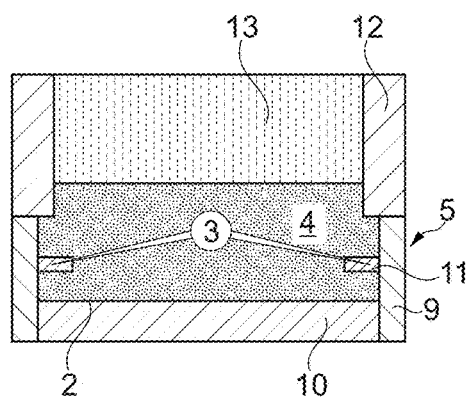
FIG. 5 shows an illustration like that in FIG. 4 but in the fully upset state.

FIG. 2 then illustrates the subsequent method step, in which a top die 12 is placed on the bottom die 9, wherein an inside diameter $d_{IO}$ of the top die 12 is smaller than an inside diameter $d_{IU}$ of the bottom die 9. As shown in FIGS. 3 to 5, the piston blank 4 is then upset by means of an upsetting punch 13, wherein the ring carrier 3 is firmly connected to the piston blank 4, in particular infiltrated by the alloy of the piston blank 4 and thus interlocked.

Figure 6:
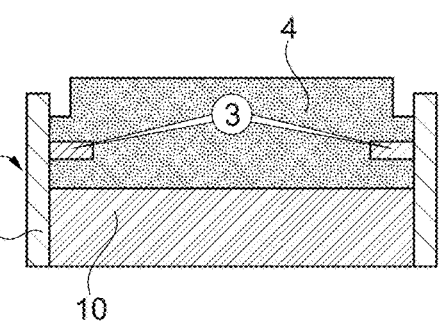
FIG. 6 shows the preforged piston blank during retraction from the bottom die and with the top die removed.
Figure 7:
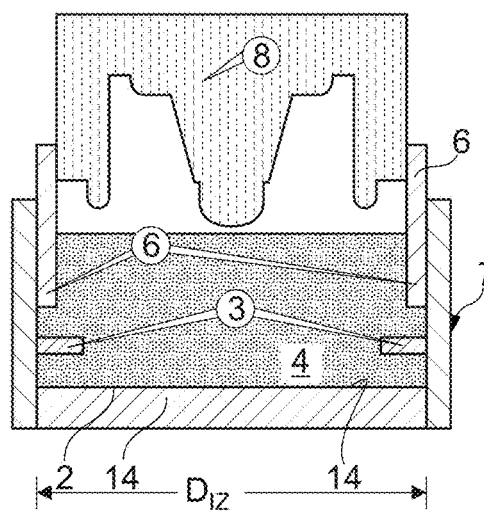
FIG. 7 shows a section through a second forming tool with the holding-down tool inserted.
Figure 8:
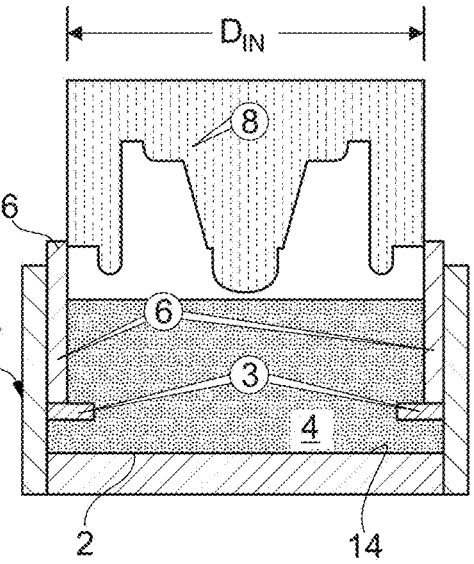
FIG. 8 shows an illustration like that in FIG. 7 but with a piston blank upset in a different way and a holding-down tool lowered completely onto a ring carrier.

In the method step illustrated in FIG. 6, the preforged piston blank 4 is then removed from the first forming tool 5 and, as shown in FIG. 7, placed in a second forming tool 7, the inside diameter $d_{IZ}$ of which corresponds to the inside diameter $d_{IU}$ of the bottom die 9 of the first forming tool 5. Here, a subsequent piston head 2 of the piston blank 4 rests on a final forming base 14 of the second forming tool 7. According to FIG. 7, the holding-down tool 6 is then inserted, which holds down the ring carrier 3 during the subsequent forging step illustrated in FIG. 9 and the inside diameter $d_{IN}$ of which corresponds to the inside diameter $d_{IO}$ of the top die 12 of the first forming tool 5 (cf. FIG. 2).

FIG. 7 shows an embodiment in which the holding-down tool 6 is lowered only into the region of the ring carrier 3 but is not in direct contact with the ring carrier. As an alternative, it is, of course, also possible to make provision for the top die 12 to rest directly on the ring carrier 3, as shown in FIG. 2, thereby creating the possibility that the holding-down tool 6 can likewise be lowered directly onto the ring carrier 3, as shown in FIG. 8.

Figure 9:
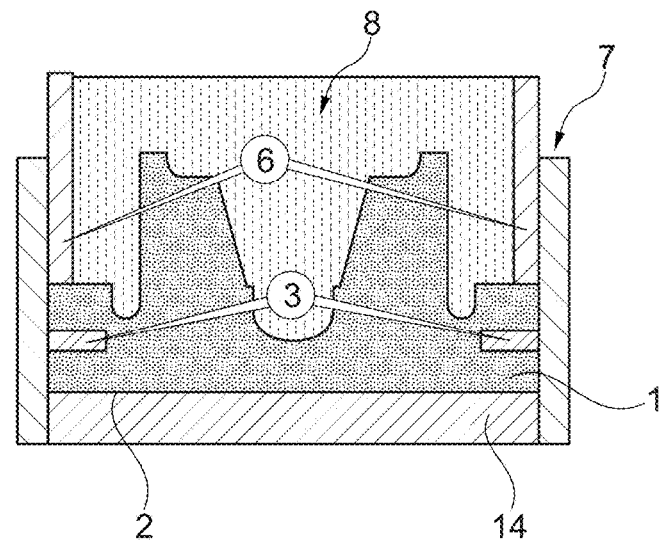
FIG. 9 shows an illustration like that in FIGS. 7 and 8 but with the final forming punch lowered.

In the subsequent method step shown in FIG. 9, the final forming punch 8 is then pressed in, and the piston blank 4 is thereby formed to give the piston 1. In a further production step (not shown), the piston 1 can then be removed from the second forming tool 7 and finish-machined, being ground or turned for example.

Before being placed in the first forming tool 5, the ring carrier 3 is usually heated under a protective gas atmosphere, thereby largely avoiding possible corrosion or scale formation on the ring carrier independently of the preheating time. Here, the ring carrier 3 is heated so rapidly that the heat-up time of the ring carrier 3 is shorter than the cycle time for forging.

An aluminum-silicon alloy or an aluminum-copper alloy is usually used for the piston 1 or piston blank 4, offering advantages in respect of corrosion resistance and workability and, in particular, suitability for forging. During upsetting, a temperature of the piston blank 4 is no more than 220 K, preferably 50 to 80 K, below the solidus temperature of the two main alloying components of the piston blank 4, which has the major advantage that stresses under thermal loads at the interface between the ring carrier and the piston alloy, of the kind which occur during operation of the engine owing to the differing thermal expansion coefficients of the materials of the piston blank and the ring carrier, are minimized.

For the ring carrier 3, in turn, an iron alloy or a nickel alloy is used and, in particular, sintering powder containing more than 28% by volume of particles with a diameter of d<150 μm is used for sintering the ring carrier 3, thereby making it possible to achieve a porosity of the ring carrier 3 of between 20 and 80% by volume. Such a high open porosity makes it possible for the alloy of the piston ring 4 to infiltrate the ring carrier 3 during the upsetting of the piston blank 4 and thereby to interlock extremely well with the carrier.

The method according to the invention thus represents a complete departure from previous forging methods, wherein, in the method according to the invention, the ring carrier 3 is first of all forged in and only then is the piston blank 4 finally formed to give the piston 1. With the forming of the internal shape taking place first, as previously, very different forces were applied to the ring carrier 3 in the direction of a piston longitudinal axis over the circumference of the ring carrier owing to the lack of rotational symmetry of the case and bosses, producing high internal transverse forces which, in the worst case, could lead to shaft runout.

By the reversal of the method steps and the introduction of the intermediate step as well as by holding down the initially forged-in ring carrier 3 during the final forging of the piston 1, the internal shape can be formed or forged without damaging the previously forged-in ring carrier 3 since said ring carrier is held by means of the holding-down tool 6, at least over partial areas or over the entire circumference, and is thereby relieved of loads.

The invention claimed is:

1. A method for producing a piston, comprising:
  forming a piston blank in a first forming tool such that the piston blank surrounds a ring carrier configured to receive a piston ring via positive engagement after producing the ring carrier by a sintering process, wherein the piston blank, at least in a circumferential region disposed at a piston head, is composed of a light metal alloy suitable for forging;
  removing the piston blank from the first forming tool and placing the piston blank in a second forming tool, and inserting a holding-down tool into the second forming tool to hold the ring carrier down; and
  pressing a final forming punch into the second forming tool to deform the piston blank and form a piston.

2. The method as claimed in claim 1, wherein forming the piston blank includes:
  placing the piston blank in a bottom die of the first forming tool such that the piston head rests on an upsetting base of the bottom die, wherein the piston blank has a first outside diameter at the piston head that narrows via a step to a second, smaller outside diameter, and wherein the piston blank is held positively via the first outside diameter in the bottom die;
  placing the ring carrier on the step, the ring carrier having an outside diameter substantially corresponding to an inside diameter of the bottom die;
  placing a top die on the bottom die, wherein an inside diameter of the top die is smaller than the inside diameter of the bottom die;
  upsetting the piston blank via an upsetting punch, wherein upsetting the piston blank includes connecting the ring carrier to the piston blank via infiltration;
  wherein removing the piston blank from the first forming tool and placing the piston blank in the second forming tool includes resting the piston blank on an inside diameter of the second forming tool that corresponds to the inside diameter of the bottom die of the first forming tool such that the piston blank in a region of the piston head on a final forming base of the second forming tool;
  the holding-down tool having an inside diameter corresponding to the inside diameter of the top die of the first forming tool; and
  removing the piston from the second forming tool and finish-machining the piston after pressing the final forming punch into the second forming tool.

3. The method as claimed in claim 2, wherein:
  the piston blank is composed of an alloy including two main alloying components;
  the alloy is one of an aluminum-silicon alloy and an aluminum-copper alloy; and
  upsetting the piston blank includes upsetting the piston blank while a temperature of the piston blank is no more than 220 K below a solidus temperature of the two main alloying components.

4. The method as claimed in claim 3, wherein the temperature of the piston blank during upsetting is 50 to 80 K below the solidus temperature of the two main alloying components.

5. The method as claimed in claim 2, further comprising heating the ring carrier under a protective gas atmosphere before forming the piston blank in the first forming tool, the ring carrier composed of a corroding material.

6. The method as claimed in claim 2, wherein the piston blank is composed of one of an aluminum-silicon alloy and an aluminum-copper alloy.

7. The method as claimed in claim 2, wherein the ring carrier is composed of one of an iron alloy and a nickel alloy.

8. The method as claimed in claim 2, further comprising sintering the ring carrier from a sintering powder before forming the piston blank, wherein the sintering powder includes more than 28% by volume of particles with a diameter $d>150$ pm.

9. The method as claimed in claim 1, further comprising heating the ring carrier under a protective gas atmosphere before forming the piston blank in the first forming tool, the ring carrier composed of a corroding material.

10. The method as claimed in claim 1, further comprising heating the ring carrier under a protective gas atmosphere before forming the piston blank in the first forming tool, a heating time of the ring carrier being shorter than a cycle time for forging.

11. The method as claimed in claim 10, wherein the ring carrier is sintered by a sintering powder containing more than 28% by volume of particles with a diameter $d>150$ μm.

12. The method as claimed in claim 1, wherein the piston blank is composed of one of an aluminum-silicon alloy and an aluminum-copper alloy.

13. The method as claimed in claim 1, wherein the ring carrier is composed of one of an iron alloy and a nickel alloy.

14. The method as claimed in claim 1, further comprising sintering the ring carrier from a sintering powder before forming the piston blank, wherein the sintering powder includes more than 28% by volume of particles with a diameter $d>150$ pm.

15. A piston produced according to the method as claimed in claim 1.

16. The piston as claimed in claim 15, wherein a porosity of the ring carrier is 20% by volume to 80% by volume.

17. The piston as claimed in claim 15, wherein the piston is composed of one of an aluminum-silicon alloy and an aluminum-copper alloy.

18. A method for producing a piston, comprising:
  producing a ring carrier configured to receive a piston ring from a sintering powder by a sintering process, the sintering powder includes more than 28% by volume of particles with a diameter $d>150$ pm, and the ring carrier composed of a corroding material;
  heating the ring carrier under a protective gas atmosphere;

forming a piston blank in a first forming tool such that the piston blank surrounds the ring carrier via positive engagement, wherein the piston blank, at least in a circumferential region disposed at a piston head, is composed of a light metal alloy suitable for forging;

removing the piston blank from the first forming tool and placing the piston blank in a second forming tool, and inserting a holding-down tool into the second forming tool to hold the ring carrier down; and pressing a final forming punch into the second forming tool to deform the piston blank and form a piston.

19. The method as claimed in claim 18, wherein the piston blank is composed of one of an aluminum-silicon alloy and an aluminum-copper alloy.

20. The method as claimed in claim 18, wherein the ring carrier is composed of one of an iron alloy and a nickel alloy.

* * * * *